United States Patent [19]

Benseman

[11] 4,088,118
[45] May 9, 1978

[54] HEAT EXCHANGER

[75] Inventor: Roy Fergus Benseman, Wellington, New Zealand

[73] Assignee: Development Finance Corporation, New Zealand

[21] Appl. No.: 544,797

[22] Filed: Jan. 28, 1975

[30] Foreign Application Priority Data

Feb. 5, 1974 New Zealand .................. 173279

[51] Int. Cl.² ............................................. F24J 3/02
[52] U.S. Cl. ..................................... 126/271; 165/106
[58] Field of Search ............................ 165/106, 49, 56; 126/271; 219/341, 365

[56] References Cited

U.S. PATENT DOCUMENTS

| 905,159 | 12/1908 | Dunham | 219/341 |
|---|---|---|---|
| 1,661,281 | 3/1928 | Bilan | 219/341 |
| 1,778,464 | 10/1930 | Ogilvie | 219/341 |
| 1,889,238 | 11/1932 | Clark | 126/271 |
| 3,250,269 | 5/1966 | Sherock | 126/271 |

FOREIGN PATENT DOCUMENTS

| 505,980 | 9/1954 | Canada | 165/106 |
|---|---|---|---|
| 72,019 | 3/1915 | Switzerland | 219/341 |
| 152,394 | 1/1932 | Switzerland | 165/106 |
| 257,348 | 4/1949 | Switzerland | 126/271 |
| 979,262 | 1/1965 | United Kingdom | 165/106 |

Primary Examiner—Albert W. Davis, Jr.
Attorney, Agent, or Firm—Holman & Stern

[57] ABSTRACT

A panel type absorber of radiant energy, applicable in particular as a solar collector, is formed of two shallow trays sealed together as a box. Energy absorbed at one face is conveyed by convection of a primary fluid to a heat exchanger integral with the box and consisting of one or more pipes, horizontal or vertical, which convey a secondary fluid to be heated. Air is excluded from the primary fluid to minimize corrosion.

1 Claim, 6 Drawing Figures

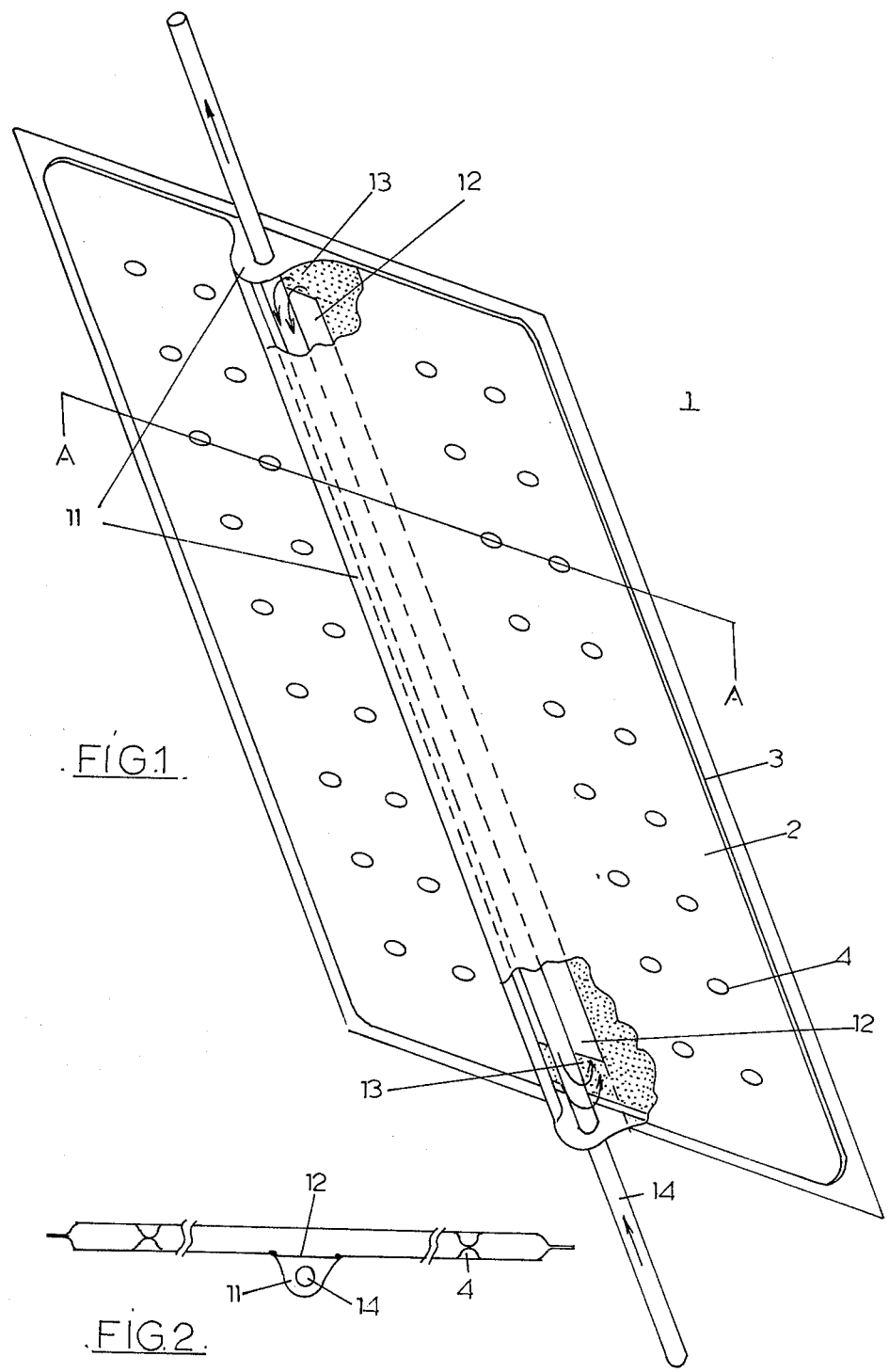

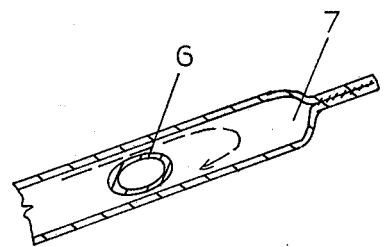
FIG. 4.
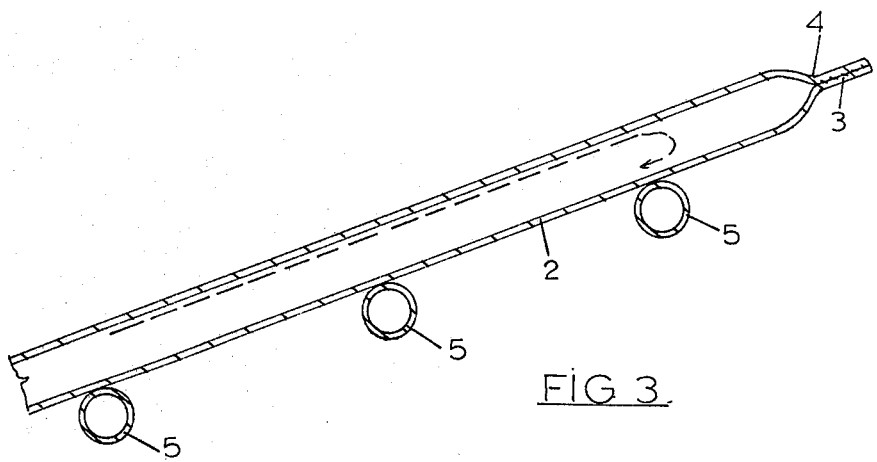
FIG. 3.
FIG. 5.
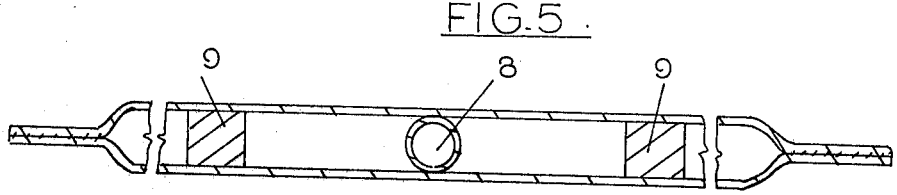
FIG. 6.
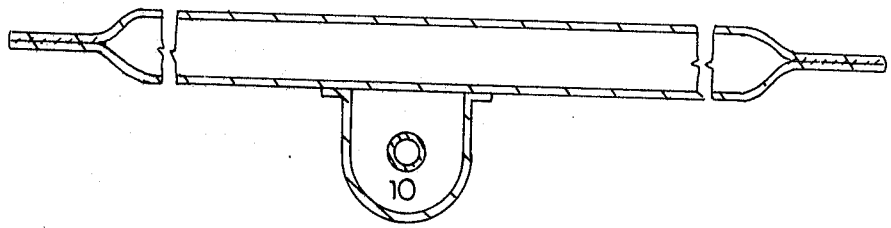

HEAT EXCHANGER

FIELD OF THE INVENTION

This invention relates to a heat exchanger.

BACKGROUND OF THE INVENTION

It relates in particular to that form of heat exchanger commonly known as a solar absorber, but the principles of the invention are not limited to this application. The discussion and description which follow deal for convenience with a solar absorber, but their extension to other fields is considered to be obvious.

In this specification, the following definitions are used:

Solar Absorber — A device with an extended surface exposed to, and absorbing, solar radiation.

Primary Fluid — The fluid contained within the absorber.

Secondary Fluid — The fluid that is to be heated and used. Normally potable water for a domestic or industrial hot water supply.

Heat exchanger — The device which removes heat from the primary fluid and transmits it to the secondary fluid.

Solar Collector — The complete assembly of weatherproof box, glass cover, back insulation, and solar absorber. Typified by the conventional "flat plate solar collector".

In many parts of the world the sun is a source of heat, and in particular, is a potential source of heat for domestic hot water. It is reliable and cheap in running costs. Many designs for solar absorbers have been produced but most of them are high in capital cost. In general, a solar absorber consists of a receiver of radiant energy, and a means of transferring the heat so collected to the body, commonly water, which is required to be heated. The traditional absorber consists of a blackened surface of a material which is a thermal conductor preferably safeguarded against loss by re-radiation, convection, or conduction and which when exposed to the sun's rays is raised in temperature to a useful extent. The receiver of radiation is almost necessarily a sheet and the heat is tranferred from it by attaching water pipes. The materials and the length of the conduction path from the sheet to the inner surface of a pipe should be as short as practical. The normal method of attaching pipes to a sheet of metal is by soldering, which is an expensive process. The material most commonly used for domestic hot water piping is copper, since there are corrosion problems if the material is not compatible with the material used for the domestic hot water storage tank; copper, is, at present, an expensive material. The manufacture of a solar heat absorber with blackened sheet with an array of copper pipes soldered or brazed to its surface, is technically satisfactory but expensive both in material and labour.

SUMMARY AND OBJECTS OF THE INVENTION

It is an object of the present invention to provide a solar absborber which is less expensive than the traditional form in material and labour and can be used in climates subject to heavy frosts.

Accordingly, the invention may be said to consist in an absorber comprising in combination a hollow plate formed by dishing two similar sheets and hermetically sealing their edges together, a primary fluid filling said hollow plate, a receiver for radiant energy comprising an external face of said hollow plate and at least one pipe which is of thermally conducting material and which is connected to a supply of secondary fluid and is exposed to thermal contact with the primary fluid at a part of the convective path of the primary fluid where incoming radiation causes the primary fluid to be hot, as a means of heating the secondary fluid.

The invention consists in the forgoing and also envisages constructions of which the following relates to a solar collector by way of example only.

One preferred form of the invention will now be described, with reference to the accompanying drawings in which:

BRIEF DESCRIPTION OF THE DRAWINGS

FIG. 1 is an isometric view of the preferred form of absorber, with portions removed for showing details of constructions and operation.

FIG. 2 is a diagramatic view taken substantially at line A-A of FIG. 1 showing how both sides are assembled.

FIG. 3 is a fragmentary cross-section of another absorber, showing a detail of construction and a second form of heat exchanger.

FIG. 4 is analogous to FIG. 3, showing a third form of heat exchanger.

FIG. 5 is a fragmentary cross-section, corresponding to FIG. 2, showing a fourth form of heat exchanger.

FIG. 6 is similar to FIG. 5, but shows an alterative method of constructing the heat exchanger of FIG. 1.

DESCRIPTION OF THE PREFERRED EMBODIMENTS

A single unit 1 may consist of a flat solar absorber of about 4 feet × 2 feet. It is formed by taking two sheets of plate (24 gauge car body steel has been found convenient, but other materials may be used), suitably protected against corrosion and pressing each of them into a dish about 3/16 inch deep with a flat bottom 2 and a raised edge 3 parallel to the bottom and about ½ inch wide. Dimples 4 are formed to project up into the dish. The dimples in the two sheets are arranged in the geometrical configuration so that they meet when the two dishes are brought together. This is shown in FIG. 2. The two sheets are put together so as to form a hollow box and the edges are welded or otherwise joined so as to be airtight. The space between the two flat faces of the box should be about ⅜ inch. One face of the box is painted black, or otherwise treated, to ensure efficient absorption of radiation. This box is the solar absorber and the blackened surface will hereafter be called the front of the absorber, and the other surface, the back of the absorber.

After assembly, the box is filled with the primary fluid. This is normally water, but for an absorber to be used in a climate and in conditions such that heat may not be extracted from the fluid as fast as it is supplied, it may be more convenient to use a fluid of higher boiling point. It should not be toxic in case a leak develops. Diesel oil has been used successfully, but the absorber then worked at an efficiency 10% – 15% less than with water.

For use in cold climates, a primary fluid of low freezing point may be used.

The primary fluid is sealed permanently within a container. Liquids can be used that would normally be contaminants, and oxidation of the vessel is discouraged by the prevention of access of fresh oxygen. It has been found possible by the removal of oxidants and other corrosive agents from water enclosed as the primary fluid, especially by evacuation, to preserve the inside of a steel container rust-free during several months of testing. After evacuation, the small amount of oxygen and other corrosive agents in the water are quickly and harmlessly removed. Since the primary fluid is enclosed, no fresh corrosive agent is supplied.

The absorber is mounted in a shallow box covered on one face with glass. The front of the absorber is mounted parallel to, and about one inch below the glass, and the back of the absorber is covered with thermal insulation to reduce heat loss. The entire assembly consisting of box etc constitutes a solar collector. In use, the solar collector is inclined so that the 2' edge of the absorber is horizontal and the glass cover faces towards the direct rays of the sun. Solar radiation passes through the glass, falls on the blackened front of the absorber plate where it is absorbed and heats the primary fluid. So long as the absorber is at angle greater than about 15° to the horizontal, a convective flow is set up. The primary fluid heats the secondary fluid via the heat exchanger, and the secondary fluid is circulated by natural convection or pumping. The secondary fluid, which is normally water, may be moved to and stored in an insulated tank for later use.

Two alternative forms of heat exchanger, and the associated pattern of natural convection within the absorber, are now described.

1. Horizontal Exchangers: (FIGS. 3 & 4): In this form, the heat exchanger consists of one or more copper pipes at, or near, the highest level of the absorber panel. In FIG. 3, the pipes 5 are attached by soldering, brazing, or other means to ensure good thermal contact to the exterior back face of the absorber at distances of 1 inch, 3 inches and 5 inches near the top edge of the absorber; ⅜ inch diameter copper pipe has been found convenient. The secondary fluid is circulated through one or more of these pipes. Following FIG. 4, a horizontal heat exchanger may be fitted between the front and back surfaces of the absorber prior to sealing and filling. In this case, a shaped copper pipe 6 is convenient to use; it is flattened to about 3/16 inch and is set in the middle of the space between the two sheets with the top edge about 1 inch from the top 7 of the absorber. Space is left for the primary fluid to circulate around and over the heat exchanger i.e. 6. Convenient terminations are arranged to get the secondary fluid to and from the heat exchanger.

The form of primary fluid circulation is shown by arrows in FIGS. 3 and 4 and is that of fluid heated at the front, i.e. hot, face of the absorber, rising by natural convection towards the heat exchanger through which the cooler secondary fluid is circulating. At the heat exchanger, the primary fluid is cooled and sinks by reason of being more dense, the flow being largely confined to a layer adjacent to the back, i.e. lower, surface of the absorber. The rising heated fluid and descending cool fluid do not appear to mix significantly and are stratified by their natural temperature difference.

A unit similar to that described above has in a trial installation provided 85% to 90% of the thermal efficiency as compared with the more expensive unit obtained by attaching copper pipes to copper sheet. Thermal performance falls off if the collector is tilted at angles, below 15 degrees. At these low angles natural convection of the primary fluid is inhibited.

2. Vertical Exchanger: This, the preferred, form of exchanger consists of one or more pipes mounted in a vertical plane on, or near, the long axis of the absorber. In FIG. 5, a ⅜ inch copper pipe 8 is fitted between the front and back surfaces of the absorber and brought out through airtight seals at the top and bottom edges. A channel is formed along the length of the pipe by using ⅜ inch square neoprene strips 9 set two inches to each side of this pipe 8 and terminating about 3 inches from the top and bottom edges of the collector. The number of strips can be varied. Alternatively, a 2 inch as seen in FIG. 6 pipe 10 can be connected through the top back and bottom back of the absorber and run the full 4 foot length of the absorber. As seen in FIGS. 1 and 2, a ½ inch copper pipe 14 can be run along the axis of this pipe and brought out through airtight seals. Pipe 10 can be formed by welding strip in a trough configuration to the back of the absorber as shown in FIG. 6 and 2 inch × 1 inch holes through the back face communicate with the interior at the trough. FIGS. 1 and 2 show a preferred variant of FIG. 6. The back face of the absorber is pressed during manufacture into a groove 11. A flat strip 12, with gaps 13 at the top and bottom, forms a channel for the downward flow of primary fluid. A pipe 14 sealed into groove 11 carries secondary fluid.

A vertical exchanger has the advantage that it enables the secondary fluid to circulate by thermosyphon.

The form of primary fluid circulation is that of a fluid heated in the absorber, rising by natural convection to the top of the absorber, and returning via the internal channel 8 or external tube 10 or 11, to the bottom of the absorber. During this return passage it is cooled by contact with the copper pipe 14 through which is circulating the secondary fluid. Circulation of the primary fluid is maintained by the temperature difference between the fluid in the absorber panel and that which is cooled in the return channel.

A vertical unit similar to that described has on trial provided 90% to 95% of the thermal efficiency of a more expensive unit obtained by attaching copper pipes to copper sheet.

A solar collector incorporating the solar absorber herein described is used in the manner conventional with flat plate solar collectors except when circumstances require it to be supported horizontally so that there is little or no natural convection of the primary fluid.

Where circulation of the secondary fluid depends on a pump, should the pump fail, it is possible for the absorber plate to overheat and for the water in the absorber to boil. It has been found on trial that this is a rare occurrence but any risk of the absorber bursting is removed by forming on the absorber face a small plug of low melting point metal. This plug covers a small hole in the plate. At a temperature of 95° C, the plug melts and prevents any build up of pressure within the absorber. The risk can be also avoided by using a primary fluid, other than water, with a higher boiling point, or by a solar-operated pump or other known art.

It is possible to use a fluid with a low boiling point. By "low", it is meant a boiling point which is below the temperature that the absorber fluid would attain in normal use. Such a fluid would boil when exposed to heating by the sun and the convection pattern would be of vapour flowing upwards, carrying heat by latent heat, and being condensed at the heat exchanger and continuing its convection circuit as a liquid.

The flat plate collector described is stated to be 4' × 2'. It is estimated that five such collectors would be needed for the normal needs of a family. Of course, larger sizes could be made according to the present pattern.

The advantages of the present invention over conventional flat plate solar absorbers are:
1. It minimizes the use of expensive copper.
2. Corrosion is inhibited by the sealing of one or more vessels containing the primary fluid.
3. Since there is no through-put of the primary fluid, the choice of it is not limited to water.

The advantages of the present invention over a system using a separate heat exchanger are:
1. It uses less copper in the heat exchanger.
2. The embodiments of the present invention which have a flow of secondary fluid aligned with the direction of maximum inclination may be used efficiently in natural thermo-syphon systems.

It will be understood that this design of heat exchanger is not limited in use to being a solar absorber. It can, without alteration, be a receiver of radiant energy from other sources. With or without obvious modifications it can be used to receive energy other than by radiation. With correct orientation it can also be used as a heating element with heat supplied to the secondary fluid, transferred to the primary fluid via the heat exchanger, and transferred finally from the absorber to the environment.

What I claim is:
1. In a solar collector for heating a liquid by solar energy, a solar absorber plate comprising a hollow plate completely filled with a primary liquid, said hollow plate in use being inclined with respect to the horizontal, at least one liquid-conducting pipe of heat conducting material in thermal contact with the primary liquid filling the hollow plate and adapted to convey a secondary liquid to be heated by solar energy, the hollow plate having a first face having an internal and external surface which is opaque to and an absorber of radiant energy applied to the external surface of the first face of the plate so that radiant energy causes the primary liquid adjacent to said first face to be heated and a convective circulation to develop within the plate of primary liquid which moves upwards past said first face, said at least one pipe being so arranged in relation to the hollow plate that it lies in the path of the bulk of the downward moving primary liquid of the convective system wherein said at least one pipe passes through the hollow plate within a groove extending into a back face portion of the hollow plate, said groove defining a baffle on one side of said one pipe, and a flat strip extending along and over the groove, except at the ends thereof, forming a baffle on the other side of said at least one pipe.

* * * * *

UNITED STATES PATENT AND TRADEMARK OFFICE
CERTIFICATE OF CORRECTION

PATENT NO. : 4,088,118
DATED : May 9, 1978
INVENTOR(S) : Roy Fergus Benseman

It is certified that error appears in the above-identified patent and that said Letters Patent are hereby corrected as shown below:

[73] Assignment:

Development Finance Corporation of New Zealand

Signed and Sealed this

Sixteenth Day of January 1979

[SEAL]

Attest:

RUTH C. MASON
*Attesting Officer*

DONALD W. BANNER
*Commissioner of Patents and Trademarks*